(12) United States Patent
Cheng et al.

(10) Patent No.: US 9,338,256 B2
(45) Date of Patent: May 10, 2016

(54) SYSTEM FOR GENERATING PAGE ELEMENT BY SERVER USING INTERFACE CONFIGURATION ACQUIRING FROM USER EQUIPMENT

(71) Applicant: Huawei Technologies Co., Ltd., Shenzhen (CN)

(72) Inventors: Jian Cheng, Nanjing (CN); Zhigang Huang, Nanjing (CN); Hui Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 13/906,468

(22) Filed: May 31, 2013

(65) Prior Publication Data

US 2013/0325931 A1    Dec. 5, 2013

(30) Foreign Application Priority Data

May 31, 2012 (CN) .......................... 2012 1 0176844

(51) Int. Cl.
*H04N 21/485* (2011.01)
*H04L 29/06* (2006.01)
(Continued)

(52) U.S. Cl.
CPC ................ *H04L 67/42* (2013.01); *G06F 3/048* (2013.01); *G06F 3/0482* (2013.01);
(Continued)

(58) Field of Classification Search
CPC .............. H04M 1/72522; H04L 41/06; H04L 67/2823; H04L 61/1517; H04L 12/2809; H04L 12/282; H04L 47/2483; H04L 29/12509; H04L 41/0853; H04L 41/22; H04L 67/025; H04L 67/125; H04N 7/165; H04N 21/472; H04N 21/485; H04W 36/0022; G06F 3/048; G06F 3/0482
See application file for complete search history.

(56) References Cited

U.S. PATENT DOCUMENTS

2006/0242248 A1* 10/2006 Kokkinen ......... H04M 1/72522
709/206
2007/0124449 A1* 5/2007 Kang ..................... H04L 41/06
709/223
(Continued)

FOREIGN PATENT DOCUMENTS

CN          101067819 A    11/2007
CN          101150803 A     3/2008
(Continued)

OTHER PUBLICATIONS

"Networked Digital Media Standards: A UPnP/DLNA Overview" Allegro Software Development Corporation, www.allegrosoft.com, Oct. 26, 2006.

*Primary Examiner* — Le H Luu
(74) *Attorney, Agent, or Firm* — Brinks Gilson & Lione

(57) ABSTRACT

Embodiments of the present invention relate to the communications field and provide a method, an apparatus, and a system for acquiring media. The method for acquiring media includes the following: A user interface server acquires a media acquiring request generated by a browser, where the media acquiring request includes interface configuration information of a user equipment; and the user interface server generates, according to the interface configuration information, a page element corresponding to an interface of the user equipment, and the user interface server sends the page element to the user equipment, or the user interface server generates, according to the interface configuration information, page information corresponding to the interface of the user equipment, and the user interface server sends the page information to the user equipment, where the page information includes the page element and media information.

18 Claims, 4 Drawing Sheets

```
┌─────────────────────────────────────────────────────────────┐
│ A user interface server acquires a media acquiring request  │   S101
│ generated by a browser, where the media acquiring request   │
│ includes interface configuration information of a user      │
│ equipment                                                    │
└─────────────────────────────────────────────────────────────┘
                              │
                              ▼
┌─────────────────────────────────────────────────────────────┐
│ The user interface server generates, according to the       │
│ interface configuration information, a page element         │
│ corresponding to an interface of the user equipment, and    │
│ then the user interface server sends the page element to    │   S102
│ the user equipment, or the user interface server generates, │
│ according to the interface configuration information, page  │
│ information corresponding to the interface of the user      │
│ equipment, and then the user interface server sends the     │
│ page information to the user equipment, where the page      │
│ information includes the page element and media information │
└─────────────────────────────────────────────────────────────┘
```

(51) Int. Cl.
*H04N 21/472* (2011.01)
*H04L 12/24* (2006.01)
*G06F 3/0482* (2013.01)
*H04L 29/08* (2006.01)
*G06F 3/048* (2013.01)

(52) U.S. Cl.
CPC ........... *H04L 41/0853* (2013.01); *H04L 41/22* (2013.01); *H04L 67/025* (2013.01); *H04L 67/125* (2013.01); *H04L 67/36* (2013.01); *H04N 21/472* (2013.01); *H04N 21/485* (2013.01)

(56) References Cited

U.S. PATENT DOCUMENTS

| | | |
|---|---|---|
| 2007/0211734 A1 | 9/2007 | Yang et al. |
| 2007/0260652 A1 | 11/2007 | Kaarela et al. |
| 2007/0300252 A1* | 12/2007 | Acharya ............... H04N 7/165 725/25 |
| 2008/0043834 A1* | 2/2008 | Lesser ............... H04L 67/2823 375/240 |
| 2009/0031008 A1* | 1/2009 | Elliott ............... H04L 61/1517 709/220 |
| 2009/0058885 A1 | 3/2009 | Park et al. |
| 2009/0076749 A1* | 3/2009 | Nasle ................... G05B 17/02 702/62 |
| 2010/0058398 A1 | 3/2010 | Ojala et al. |
| 2010/0128709 A1* | 5/2010 | Liu ................... H04W 36/0022 370/338 |
| 2010/0281534 A1 | 11/2010 | Poder et al. |
| 2010/0305722 A1 | 12/2010 | Jin et al. |
| 2011/0138290 A1* | 6/2011 | Park ..................... H04L 12/2809 715/734 |
| 2012/0166581 A1* | 6/2012 | Nakajima ............. H04L 12/282 709/217 |
| 2012/0232970 A1* | 9/2012 | Kara ................ G07B 17/00024 705/14.4 |
| 2013/0046863 A1* | 2/2013 | Bastian ............... H04L 47/2483 709/220 |
| 2014/0208393 A1* | 7/2014 | Yasukawa ......... H04L 29/12509 726/4 |

FOREIGN PATENT DOCUMENTS

| | | |
|---|---|---|
| CN | 101155174 A | 4/2008 |
| CN | 101286211 A | 10/2008 |
| CN | 101325612 A | 12/2008 |
| CN | 101438563 A | 5/2009 |
| CN | 101778168 A | 7/2010 |
| CN | 101878616 A | 11/2010 |
| CN | 102025840 A | 4/2011 |
| CN | 102202100 A | 9/2011 |

* cited by examiner

SYSTEM FOR GENERATING PAGE ELEMENT BY SERVER USING INTERFACE CONFIGURATION ACQUIRING FROM USER EQUIPMENT

CROSS-REFERENCE TO RELATED APPLICATION

This application claims priority to Chinese Patent Application No. 201210176844.2, filed on May 31, 2012, which is hereby incorporated by reference in its entirety.

FIELD OF THE INVENTION

The present invention relates to the communications field, and in particular to a method, an apparatus, and a system for acquiring media.

BACKGROUND OF THE INVENTION

The DLNA (Digital Living Network Alliance, Digital Living Network Alliance) is an alliance organization that comprises consumer electronics, mobile phone, and computer manufacturers. The goal of the organization is to establish a set of industry standards that are capable of making products of each manufacturer mutually connect and mutually adapt, thereby implementing digital life for consumers.

According to logical function division, the DLNA defines three functional entities: an MS (Media Server, media server), an MR (Media Renderer, media renderer), and a CP (Control Point, control point). The MS is a location where media is stored, the MR is responsible for media decoding and presentation, and the CP finds and controls the MS and MR to implement multiple services. For an exemplary purpose, one DLNA television may include an MR and a CP.

The DLNA mainly applies to an application scenario on a home network (Home Network), and is difficult to adapt to a situation in which the MS or the CP is located outside the home network (for example, an operator network). To resolve this issue, in the prior art, a home network user accesses the operator network by using a Cable Modem (cable modem) and a CMTS (Cable Modem Terminal System, cable modem terminal system). The MS is located on the operator network and a DLNA Media Player (media player) is located on the user's home network. However, when the MS is accessed on a DLNA client by using the method for acquiring media, acquired user interfaces have only one or several fixed types. Screen parameters of different user equipments are different and the user interfaces cannot adapt to screen display modes of different user equipments. Therefore, the user interfaces displayed in different user equipments are significantly different, and user experience is poor.

SUMMARY OF THE INVENTION

Embodiments of the present invention provide a method, an apparatus, and a system for acquiring media, which are capable of enabling a user interface to adapt to display modes of different user equipments, improving user experience.

To achieve the preceding objectives, the embodiments of the present invention adopt the following technical solutions:

According to one aspect, a method for acquiring media is provided, including:

acquiring, by a user interface server, a media acquiring request generated by a browser, where the media acquiring request includes interface configuration information of a user equipment; and generating, by the user interface server, according to the interface configuration information, a page element corresponding to an interface of the user equipment, and sending, by the user interface server, the page element to the user equipment, or generating, by the user interface server, according to the interface configuration information, page information corresponding to the interface of the user equipment, and sending, by the user interface server, the page information to the user equipment, where the page information includes the page element and media information.

According to one aspect, a method for acquiring media is provided, including:

generating, by a browser, a media acquiring request according to a media command triggered by a user; and controlling, by the browser, a user equipment specified in the media command to enable the user equipment to send the media acquiring request to a user interface server according to uniform resource locator URL information of the user interface server, so that the user interface server generates a page element or page information according to the media acquiring request and sends it to the user equipment, where the media acquiring request includes interface configuration information of the user equipment.

According to one aspect, a user interface server is provided, including:

a first acquiring unit, configured to acquire a media acquiring request generated by a browser, where the media acquiring request includes interface configuration information of a user equipment; and a processing unit, configured to generate: according to the interface configuration information, a page element corresponding to an interface of the user equipment, and send the page element to the user equipment, or generate, according to the interface configuration information, page information corresponding to the interface of the user equipment, and send the page information to the user equipment, where the page information includes the page element and media information.

According to one aspect, a browser is provided, including:

a generating unit, configured to generate a media acquiring request according to a media command triggered by a user; and a control unit, configured to control a user equipment specified in the media command to enable the user equipment to send the media acquiring request to a user interface server according to uniform resource locator URL information of the user interface server, so that the user interface server generates a page element or page information according to the media acquiring request and sends it to the user equipment, where the media acquiring request includes interface configuration information of the user equipment.

According to one aspect, a media system is provided, including:

any one of the user interface servers; and
any one of the browsers.

The embodiments of the present invention provide a method, an apparatus, and a system for acquiring media, including the following: A user interface server acquires a media acquiring request generated by a browser, where the media acquiring request includes interface configuration information of a user equipment; and the user interface server generates, according to the interface configuration information, a page element corresponding to an interface of the user equipment, and the user interface server sends the page element to the user equipment, or the user interface server generates, according to the interface configuration information, page information corresponding to the interface of the user equipment, and the user interface server sends the page information to the user equipment, where the page information includes the page element and media information. In this way, the user interface server generates, according to the interface configuration information in the media acquiring request, the page element or page information corresponding to the interface of the user equipment, and a user interface presented by the page element or page information matches a screen parameter of the current user equipment, enabling a user to obtain good device operation experience. Therefore, the user interface is capable of adapting to display modes of different user equipments, improving user experience.

BRIEF DESCRIPTION OF THE DRAWINGS

To describe the technical solutions in the embodiment of the present invention or in the prior art more clearly, the following briefly introduces the accompanying drawings required for describing the embodiment or the prior art. Apparently, the accompanying drawings in the following description show merely some embodiment of the present invention, and persons of ordinary skill in the art may still derive other drawings from these accompanying drawings without creative efforts.

DETAILED DESCRIPTION OF THE EMBODIMENT

The following clearly and completely describes the technical solutions in the embodiments of the present invention with reference to the accompanying drawings in the embodiment of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
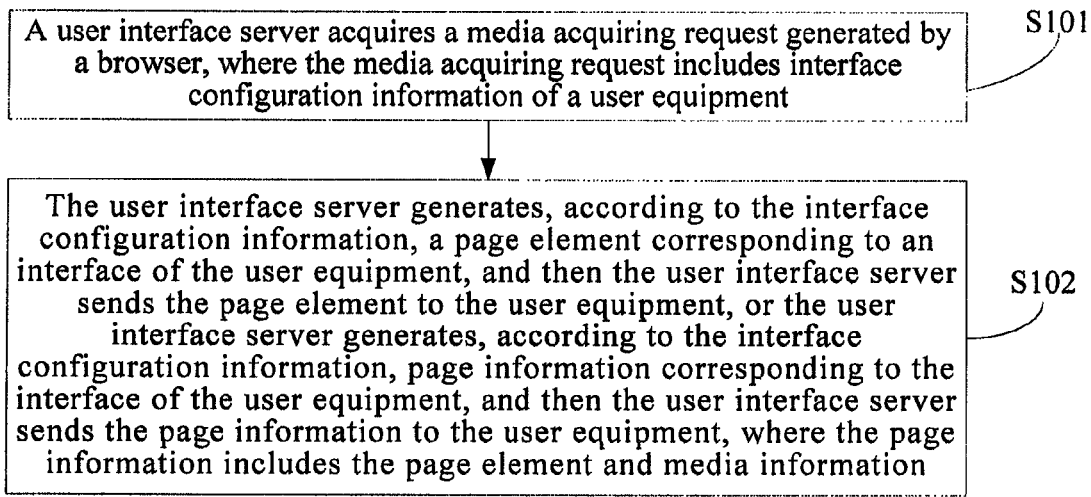
FIG. 1 is a schematic flowchart of a method for acquiring media according to an embodiment of the present invention.

An embodiment of the present invention provides a method for acquiring media. As shown in FIG. 1, the method for acquiring media may apply to a type of network architecture, where the network architecture may include: a home network that supports DLNA, an external IP network that is located outside the home network, a browser (Browser) that is located on the home network and has a control point function, a DLNA user equipment that is located on the home network, and a media server (Media Server) and a user interface server (UI Server) that are located on the external IP network, where the media server and the user interface server are capable of exchanging information. The method includes:

S101. The user interface server acquires a media acquiring request generated by the browser, where the media acquiring request includes interface configuration information of the user equipment.

S102. The user interface server generates, according to the interface configuration information, a page element corresponding to an interface of the user equipment, and then the user interface server sends the page element to the user equipment, or the user interface server generates, according to the interface configuration information, page information corresponding to the interface of the user equipment, and then the user interface server sends the page information to the user equipment, where the page information includes the page element and media information.

The step for the user interface server to generate the page information may specifically include that: the user interface server generates, according to the interface configuration information, the page element corresponding to the interface of the user equipment; and then the user interface server sends a media information request to the media server according to the media acquiring request; afterwards, the user interface server receives media information sent by the media server, where the media information is acquired by the media server from a related network or server according to the media information request; and finally, the page element and the media information are combined into the page information.

When the user interface server generates the page element, the user interface server sends the page element to the user equipment, and the browser is capable of controlling the user equipment to combine the page element and the media information that is acquired from the media server into the page information, and display the page information on the user equipment; and when the user interface server generates the page information, the user equipment is capable of directly displaying the acquired page information.

In this way, the user interface server generates, according to the interface configuration information in the media acquiring request, the page element or page information corresponding to the interface of the user equipment, and a user interface presented by the page element or page information matches a screen parameter of the current user equipment, enabling a user to obtain good device operation experience. Therefore, the user interface is capable of adapting to display modes of different user equipments, improving user experience.

Particularly, the user interface server may further generate a control point code (CP code), After the control point code runs, an apparatus that runs the control point code is enabled to have a DLNA control point function. The control point code may be a JavaScript (a programming language) or a dynamic script code that can be executed in the browser. When a new function is added to a network, the user interface server may generate a corresponding new control point code. In this way, the browser on the home network may implement the control point function by downloading and running the control point code. When a DLNA service of the home network needs to be upgraded, the control point code may simply be upgraded, reducing costs for network configuration and decreasing user operation complexity.

It should be noted that the method for acquiring media according to this embodiment of the present invention may further apply to another type of network architecture. The network architecture includes: a home network that supports DLNA, an external IP network that is located outside the home network, a browser that is located on the home network and has a control point function, and a DLNA user equipment that is located on the home network. The network architecture may further include: a media server and a user interface server. The media server may be located on the external IP network and may also be located on the home network. In addition, the user interface server may be located on the external IP network and may also be located on the home network, where the media server and the user interface server are capable of exchanging information. Detailed steps of the method for acquiring media are basically consistent with a method for acquiring media according to another embodiment of the present invention. Persons skilled in the art can easily think of a variation or replacement within the technical scope disclosed in the present invention, and therefore, details are not repeated in the present invention.

Figure 2:
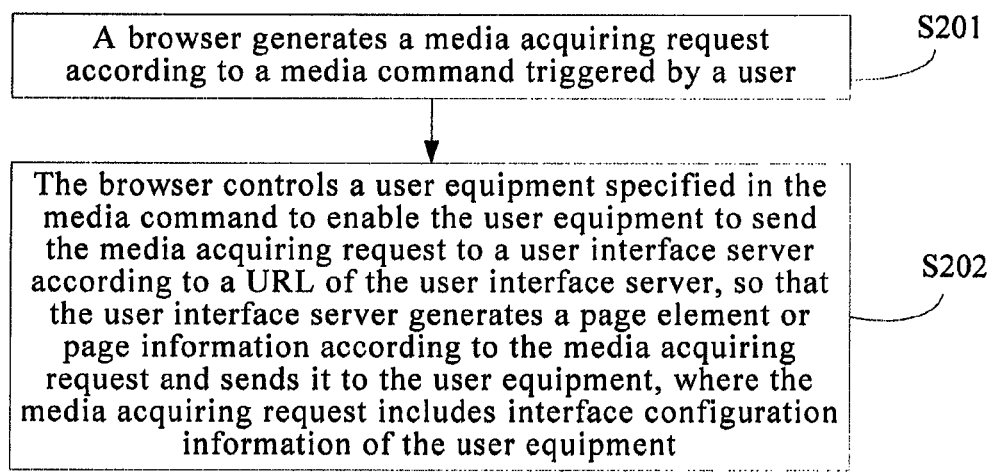
FIG. 2 is a schematic flowchart of another method for acquiring media according to an embodiment of the present invention.

A method for acquiring media according to an embodiment of the present invention shown in FIG. 2 may apply to a type of network architecture, where the network architecture includes: a home network that supports DLNA, an external IP network that is located outside the home network, a browser that is located on the home network and has a control point function, a DLNA user equipment that is on the home network, and a media server and a user interface server that are located on the external IP network, where the media server and the user interface server are capable of exchanging information. The method includes:

S201. The browser generates a media acquiring request according to a media command triggered by a user.

The media command triggered by the user may specify play time of a video or an audio and/or a display type of a video, an audio, or a picture and/or a user equipment that displays a video, an audio, or a picture, and the like. The media acquiring request generated by the browser according to the media command may further include URL (Uniform Resource Locator, uniform resource locator) information of a corresponding server in addition to information about the play time of the video or audio and/or the display type of the video, audio, or picture and/or the user equipment that displays the video, audio, or picture and/or the like.

S202. The browser controls a user equipment specified in the media command to enable the user equipment to send the media acquiring request to the user interface server according to a URL of the user interface server, so that the user interface server generates a page element or page information according to the media acquiring request and sends it to the user equipment, where the media acquiring request includes interface configuration information of the user equipment.

It should be noted that, for the control by the browser on the user equipment, reference may be made to a process in which a control point device controls a DLNA user equipment in the prior art. Details are not repeated in this embodiment of the present invention.

In this way, the user equipment acquires the page element or page information that corresponds to an interface of the user equipment and is sent by the user interface server, and a user interface presented by the page element or page information matches a screen parameter of the current user equipment, enabling the user to obtain good device operation experience. Therefore, the user interface is capable of adapting to display modes of different user equipments, improving user experience.

Particularly, before step S201, the browser needs to perform a corresponding device discovery process, specifically including the following:

The browser acquires URL information of the user interface server: The browser may acquire the URL information of the user interface server by receiving an SSDP (Simple Service Discovery Protocol, Simple Service Discovery Protocol) NOTIFY message, where the SSDP NOTIFY message includes the URL information of the user interface server; or the browser may acquire the URL information of the user interface server according to preset redirection entry information, where the redirection entry information is the URL information of the user interface server. After acquiring the URL information of the user interface server, the browser is capable of establishing a connection with the user interface server. It should be noted that OSI (Open System Interconnection, Open System Interconnection) is a network system structure recommended by the International Organization for Standardization, that is, a 7-layer reference model. It specifically includes: the physical layer, the data link layer, the network layer, the transport layer, the session layer, the presentation layer, and the application layer. For a device discovery process in the prior art, a transmission tunnel of the data link layer needs to be established between the home network and an operator network. The device discovery process according to this embodiment of the present invention is based on an existing IP network layer, reducing costs for network device configuration.

Further, the browser may acquire a control point code from the user interface server. After the control point code runs, an apparatus that runs the control point code is enabled to have a DLNA control point function. Then, the browser runs the control point code, and therefore, the browser has the DLNA control point function.

The control point code may be a JavaScript (a programming language) or a dynamic script code that can be executed in the browser. When a new function is added to a network, the user interface server may generate a new control point code corresponding to the interface of the user equipment. In this way, the browser on the home network may implement the control point function by downloading and running the control point code. When a DLNA service of the home network needs to be upgraded, the control point code may simply be upgraded, reducing costs for network configuration.

Particularly, when the browser acquires the URL information of the user interface server by receiving the SSDP NOTIFY message, the browser may further acquire the URL information of the media server according to the SSDP NOTIFY message, where the SSDP NOTIFY message includes not only the URL information of the user interface server but also the URL information of the media server.

After step S202, the method may further include the following:

The browser controls the user equipment to acquire page information from the user interface server, where the page information includes a page element and media information, the page element is generated by the user interface server according to the interface configuration information, and the media information is acquired by the user interface server from the media server.

The browser controls the user equipment to acquire the page element from the user interface server, where the page element is generated by the user interface server according to the interface configuration information.

The browser controls the user equipment to send a content directory service request to the media server, so that the media server acquires the media information from a related network or server according to the content directory service request and sends it to the user equipment.

Figure 3:
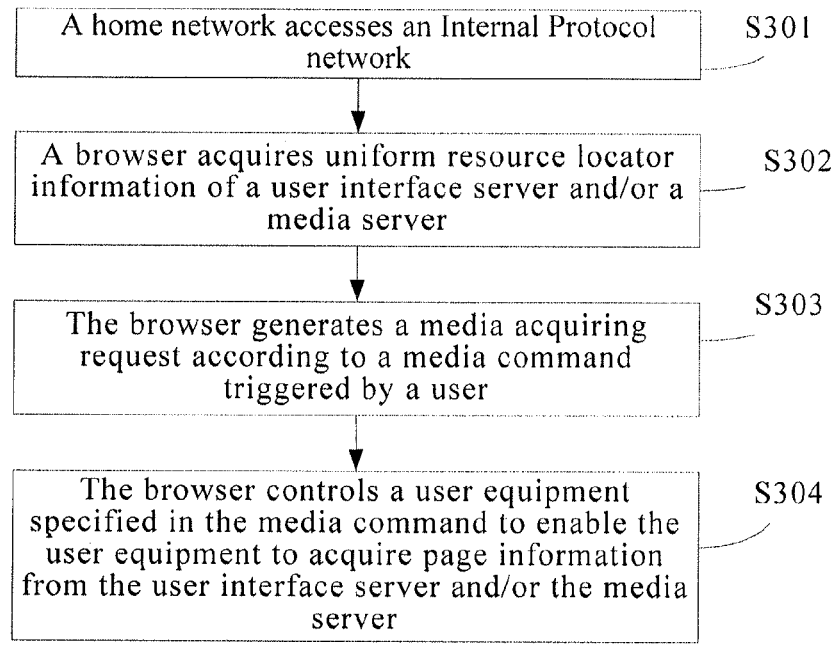
FIG. 3 is a schematic flowchart of another method for acquiring media according to an embodiment of the present invention.

For an exemplary purpose, a method for acquiring media according to an embodiment of the present invention shown in FIG. 3 specifically includes:

S301. A home network accesses an external IP network.

The home network may access the external IP network through a home gateway, where the external IP network is an IP network outside the home network. Multiple access methods may be available, for example, including: through ADSL (Asymmetric Digital Subscriber Line, asymmetric digital subscriber line), VDSL (Very-high-bit-rate Digital Subscriber loop, very-high-bit-rate digital subscriber loop) or FTTH (Fiber To The Home, fiber to the home). The home network may have one or more DLNA user equipments, such as a DLNA television, a PC (personal computer, personal computer) in which DLNA client software is installed, and a tablet computer or a smartphone in which DLNA client software is installed, where at least one DLNA client is a browser, that is, the browser is capable of running in the DLNA television, PC, and the like. A user may control the user equipment and/or the browser to perform a corresponding action by using a remote control, a keyboard, a mouse, and the like. Particularly, the external IP network may include an operator network and the Internet (Internet) Internet that is accessed through the operator network, where the operator network may completely belong to a certain operator. A media server and an interface server are deployed on the operator network. The Internet may include Internet websites, such as Google, Sina, and QQ, and is not separately owned by a certain operator. The home gateway may work in routing mode or bridge mode.

S302. The browser acquires URL information of the user interface server and/or the media server.

In a practical application, the home network accesses the external IP network, aiming to use rich media resources on the external IP network. The user equipment obtains a complete user interface that includes media resources by interacting with a corresponding server on the external IP network. For an exemplary purpose, methods for acquiring the user interface may include the combination acquiring method shown in FIG. 4 and the direct acquiring method shown in FIG. 5.

Figure 4:
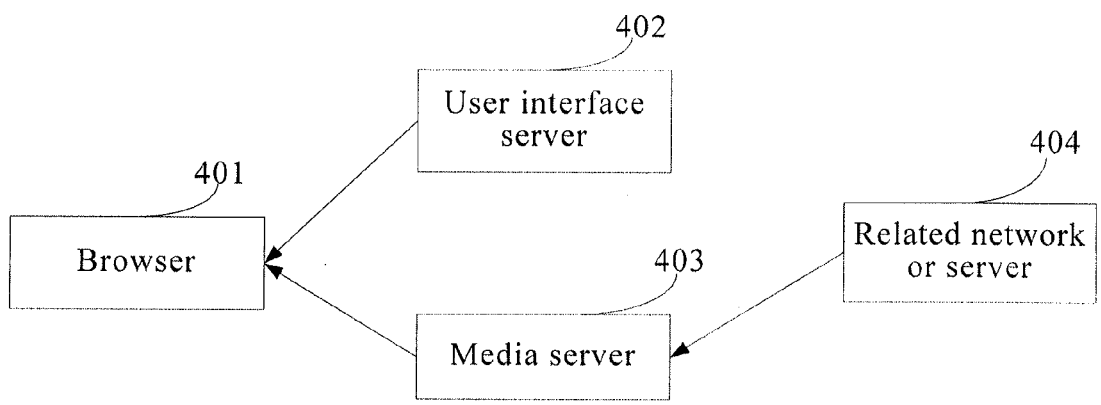
FIG. 4 is a schematic diagram of a method for acquiring media according to an embodiment of the present invention.

When the user equipment obtains the user interface by using the combination acquiring method shown in FIG. 4, the browser needs to acquire both the URL information of the user interface server and the URL information of the media server at the same time. The browser acquires the URL information of the user interface server and the URL information of the media server according to an SSDP NOTIFY message, where the SSDP NOTIFY message includes the URL information of the user interface server and the URL information of the media server. The SSDP NOTIFY message may be generated by the media server, or may be generated by the user interface server. For an exemplary purpose, firstly, the media server exchanges information with the user interface server to acquire the URL information of the user interface server. Both the media server and the user interface server are located on the external IP network. Therefore, for an information exchange method, reference may be made to the prior art, and the method is not limited in this embodiment of the present invention. Then, the media server uses the URL information of itself as the URL information of a root device (Root Device) and uses the URL information of the user interface server as the URL information of an embedded device (Embedded Device), fills the URL information of the root device and the URL information of the embedded device in the SSDP NOTIFY message, and performs multicast to a home network user through the SSDP protocol, so that all DLNA user equipments on the home network receive the message and access the media server and the user interface server according to corresponding URL information. Particularly, in a DLNA specification of the prior art, the SSDP NOTIFY message is generally sent in a period of more than 900 seconds. Sending time according to this embodiment of the present invention may be correspondingly shortened by, for example, 2 seconds. This facilitates a DLNA user equipment in acquiring the SSDP NOTIFY message in time.

Figure 5:
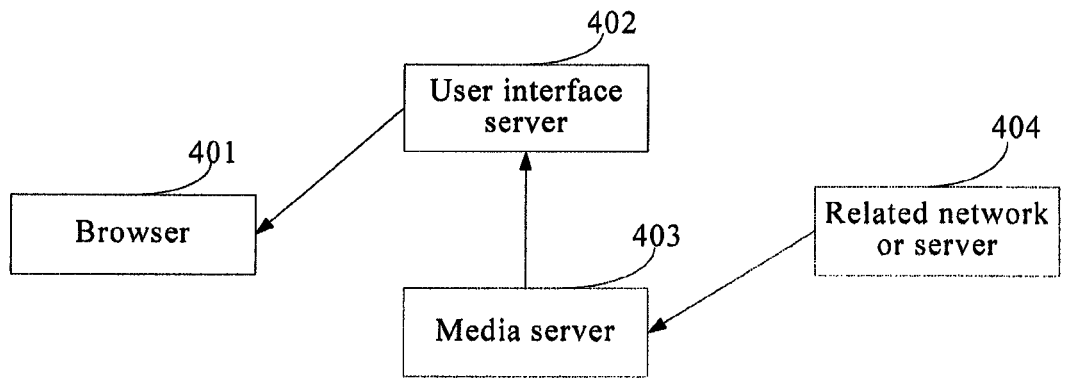
FIG. 5 is a schematic diagram of another method for acquiring media according to an embodiment of the present invention.

When the user equipment obtains the user interface by using the direct acquiring method shown in FIG. 5, the browser needs to acquire only the URL information of the user interface server. For an exemplary purpose, the browser may acquire the URL information of the user interface server according to the Simple Service Discovery Protocol SSDP NOTIFY message, where the SSDP NOTIFY message includes the URL information of the user interface server. The SSDP NOTIFY message may be generated by the media server or the user interface server and is multicasted to the home network user in multicast mode through the SSDP protocol. The browser may further acquire the URL information of the user interface server according to preset redirection entry information, where the redirection entry information is the URL information of the user interface server. The redirection entry information may be set by an operator by configuring DHCP (Dynamic Host Configuration Protocol, Dynamic Host Configuration Protocol) and a DNS (Domain Name System, domain name system).

S303. The browser generates a media acquiring request according to a media command triggered by the user.

For an exemplary purpose, the browser may provide a human-machine user interface for the user, and the user uses an input device provided by the user interface, such as a remote control, a keyboard, or a mouse, to perform input according to content provided on the user interface, such as an input focus, a button, and a menu. An input event of the user triggers a handling process in the browser to execute a corresponding media command. For example, when the focus is located on a title of a live TV channel, the user clicks the "Play" button, and a control point function of the browser is triggered to control an MR of a user equipment specified by the user to request live TV media of the media server and play a corresponding media file. Particularly, in the prior art, an MR is generally arranged in each user equipment to decode and present media information. Therefore, by default, each user equipment provided in this embodiment of the present invention has a corresponding MR.

S304. The browser controls a user equipment specified in the media command to enable the user equipment to acquire page information from the user interface server and/or the media server.

The browser controls the user equipment specified by the media command and sends corresponding information such as URL information to the user equipment to enable the user equipment to send the media acquiring request to the user interface server according to the URL information of the user interface server, so that the user interface server generates a page element or page information according to the media acquiring request. The media acquiring request may be sent by using the HTTP (Hypertext Transport Protocol, Hypertext Transport Protocol) protocol and includes interface configuration information of the user equipment. For an exemplary purpose, the interface configuration information may include information such as a size, a resolution, a model, and a color depth of a screen of the user equipment. The user interface server generates, according to the interface configuration information, a page element corresponding to an interface of the user equipment, where the page element may specifically include a framework, background, an icon, and a button of a page, and the page may be a dynamic Web page that is composed of an HTML (Hypertext Markup Language, hypertext markup language), a CSS (Cascading Style Sheet, cascading style sheet), a JavaScript, and a PNG (Portable Network Graphic Format, portable network graphic format), and the like.

Particularly, the interaction between the browser and the user equipment is the same as the interaction between a control point device and a user equipment in the prior art. Details are not repeated herein.

When the user equipment obtains the user interface by using the combination acquiring method shown in FIG. 4, the browser may control the user equipment to acquire the page element from the user interface server and/or the media server, where the page element is generated by the user interface server according to the interface configuration information. For example, the user interface server generates a page element that matches the interface configuration information according to the resolution, size, color, and the like of the screen in the interface configuration information of the current user equipment; and the browser may further control the user equipment to send a content directory service request to the media server, so that the media server acquires the media information from a related network or server according to the content directory service request and sends it to the user equipment.

When the user equipment obtains the user interface by using the direct acquiring method shown in FIG. 5, the user interface server further needs to send a media information request to the media server; and then receives the media information sent by the media server, where the media information is acquired by the media server from the related network or server according to the media information request; and finally, the user interface server combines the page element and the media information into page information. The browser controls the user equipment to acquire the page information from the user interface server, where the page information includes the page element and the media information, the page element is generated by the user interface server according to the interface configuration information, and the media information is acquired by the user interface server from the media server. In this way, the user equipment is capable of directly acquiring page information that matches the interface of itself, It should be noted that on a home network that supports DLNA, multiple DLNA user equipments may exist and at least one browser has the control point function. The browser controls a specific action of a DLNA user equipment. For an exemplary purpose, if the browser runs in a television, when the user sends a media command through a user interface provided by the television to specify a computer on the home network for playing a video, the television that has the control point function sends a control command to the computer specified in the media command to enable the computer to send a media acquiring request to the user interface server, where the media acquiring request includes interface configuration information of the computer, so that the user interface server generates a page element that matches an interface of the computer, where a resolution, a size, a color, and the like, of the page element adapt to the computer.

Alternatively, when the user interface is obtained by using the combination acquiring method shown in FIG. 4, the computer further needs to send a content directory service request to the media server, and the media server acquires media information from a related network or server according to the content directory service request. Then, the computer draws a page framework according to the acquired page element, displays a description and a picture on a page according to the media information, and combines the page element and the media information to obtain page information and play a corresponding video. For an exemplary purpose, the media information sent by the media server to the computer may include: information about a title of media, a description, a poster picture, a URL of media, and the like.

In the method for acquiring media according to this embodiment of the present invention, the user interface server generates, according to the interface configuration information in the media acquiring request, a page element or page information corresponding to an interface of the user equipment, and a user interface presented by the page element or page information matches a screen parameter of the current user equipment, enabling the user to obtain good device operation experience. Therefore, the user interface is capable of adapting to display modes of different user equipments, improving user experience. In addition, generating the control point code reduces costs for network configuration and decreases user operation complexity.

Figure 6:
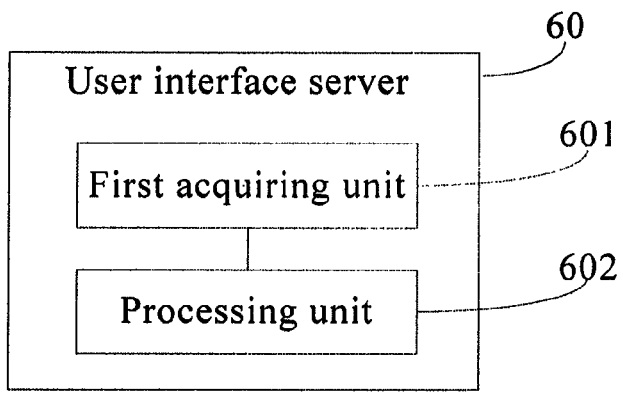
FIG. 6 is a schematic structural diagram of a user interface server according to an embodiment of the present invention.

An embodiment of the present invention provides a user interface server 60, as shown in FIG. 6, which may apply to a type of network architecture. The network architecture includes: a home network that supports DLNA, an external IP network that is located outside the home network, a browser that is located on the home network and has a control point function, a DLNA user equipment that is located on the home network, and a media server and a user interface server that are located on the external IP network, where the media server and the user interface server are capable of exchanging information. The user interface server 60 includes:

a first acquiring unit 601, configured to acquire a media acquiring request generated by the browser, where the media acquiring request includes interface configuration information of the user equipment; and a processing unit 602, configured to generate: according to the interface configuration information, a page element corresponding to an interface of the user equipment, and send the page element to the user equipment, or generate, according to the interface configuration information, page information corresponding to the interface of the user equipment, and send the page information to the user equipment, where the page information includes the page element and media information.

In this way, the processing unit generates, according to the interface configuration information in the media acquiring request acquired by the first acquiring unit, the page element or page information corresponding to the interface of the user equipment, and a user interface presented by the page element or page information matches a screen parameter of the current user equipment, enabling a user to obtain good device operation experience. Therefore, the user interface is capable of adapting to display modes of different user equipments, improving user experience.

Further, the processing unit 602 is specifically configured to:

generate, according to the interface configuration information, the page element corresponding to the interface of the user equipment; send a media information request to the media server according to the media acquiring request; receive media information sent by the media server, where the media information is acquired by the media server from a related network or server according to the media information request; and combine the page element and the media information into the page information.

Particularly, the processing unit 602 is further configured to generate a control point code. After the control point code runs, an apparatus that runs the control point code is enabled to have a DLNA control point function.

Figure 7:
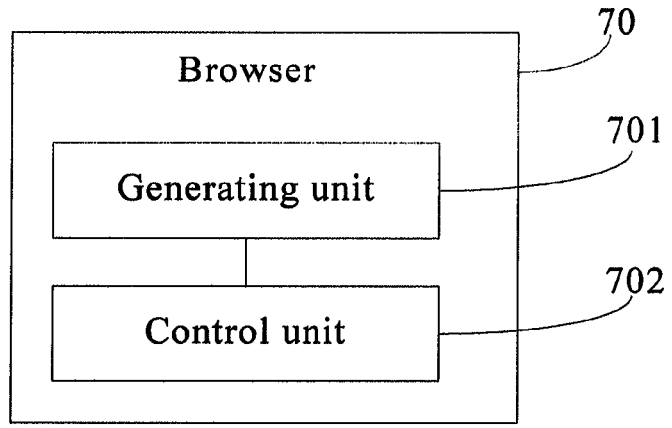
FIG. 7 is a schematic structural diagram of a browser according to an embodiment of the present invention.

An embodiment of the present invention provides a browser 70, as shown in FIG. 7, which may apply to a type of network architecture. The network architecture includes: a home network that supports DLNA, an external IP network that is located outside the home network, a browser that is located on the home network and has a control point function, a DLNA user equipment that is located on the home network, and a media server and a user interface server that are located on the external IP network, where the media server and the user interface server are capable of exchanging information. The browser 70 includes:

a generating unit 701, configured to generate a media acquiring request according to a media command triggered by a user; and a control unit 702, configured to control a user equipment specified in the media command to enable the user equipment to send the media acquiring request to the user interface server according to uniform resource locator URL information of the user interface server, so that the user interface server generates a page element or page information according to the media acquiring request and sends it to the user equipment, where the media acquiring request includes interface configuration information of the user equipment.

In this way, the browser controls the user equipment by using the control unit to send the media acquiring request to the user interface server, so that the user equipment finally acquires a page element or page information that corresponds to an interface of the user equipment and is sent by the user interface server, and a user interface presented by the page element or page information matches a screen parameter of the current user equipment, enabling a user to obtain good device operation experience. Therefore, the user interface is capable of adapting to display modes of different user equipments, improving user experience.

Figure 8:
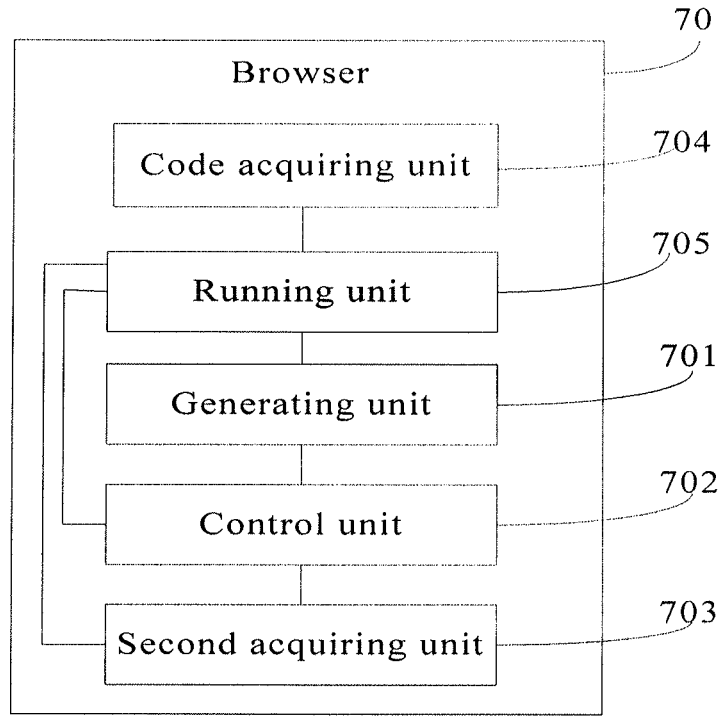
FIG. 8 is a schematic structural diagram of another browser according to an embodiment of the present invention.

Further, as shown in FIG. 8, the browser 70 further includes:

a second acquiring unit 703, configured to acquire URL information of the user interface server, and specifically configured to: acquire the URL information of the user interface server by receiving an SSDP NOTIFY message, where the SSDP NOTIFY message includes the URL information of the user interface server, and acquire URL information of the media server by receiving the SSDP NOTIFY message, where the SSDP NOTIFY message includes the URL information of the media server, and further configured to acquire the URL information of the user interface server according to preset redirection entry information, where the redirection entry information is the URL information of the user interface server;

a code acquiring unit 704, configured to acquire a control point code from the user interface server, where after the control point code runs, an apparatus that runs the control point code is enabled to have a DLNA control point function; and a running unit 705, configured to run the control point code to enable the browser to have the DLNA control point function.

Particularly, the control unit 702 is further configured to:

control the user equipment to acquire page information from the user interface server, where the page information includes a page element and media information, the page element is generated by the user interface server according to the interface configuration information, and the media information is acquired by the user interface server from the media server;

control the user equipment to acquire the page element from the user interface server, where the page element is generated by the user interface server according to the interface configuration information; and control the user equipment to send a content directory service request to the media server, so that the media server acquires the media information from a related network or server according to the content directory service request and sends it to the user equipment.

Figure 9:
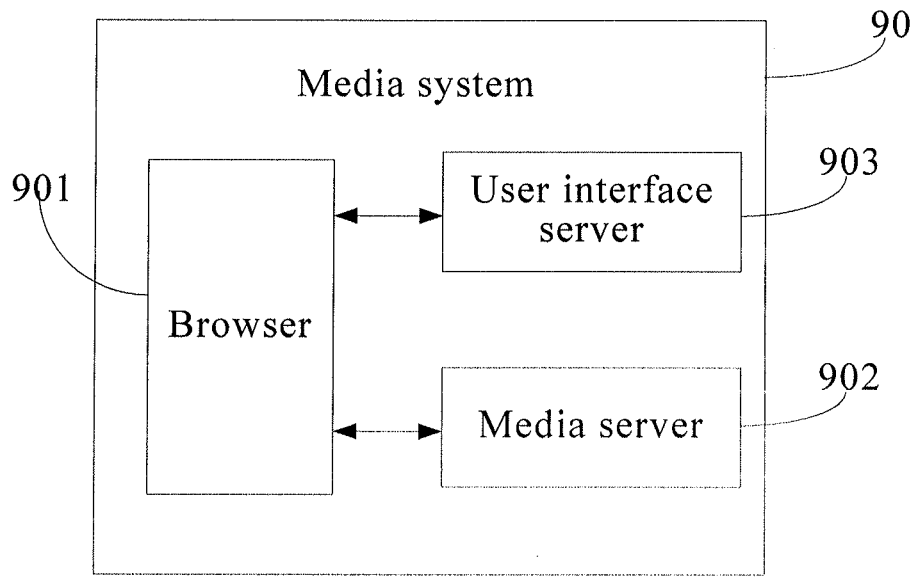
FIG. 9 is a schematic structural diagram of a media system according to an embodiment of the present invention.

An embodiment of the present invention provides a media system. As shown in FIG. 9, the media system 90 includes: a home network that supports DLNA, an external IP network that is located outside the home network, a browser 901 that is located on the home network and has a control point function, a media server 902 and a user interface server 903 that are located on the external IP network, and a DLNA user equipment (not shown in FIG. 9) that is located on the home network, where the media server 902 and the user interface server 903 are capable of exchanging information.

The user interface server 903 is any one of the user interface servers provided by the embodiments of the present invention.

The browser 901 is any one of the browsers provided by the embodiments of the present invention.

Particularly, the home network that supports DLNA may include one or more DLNA user equipments, such as a DLNA television, a PC (personal computer, personal computer) in which DLNA client software is installed, a tablet computer or a smartphone in which DLNA client software is installed, where at least one DLNA client is the browser 901, that is, the browser 901 is capable of running in the DLNA television, PC, and the like, to control a DLNA user equipment on the DLNA home network. A user may instruct, by using a remote control, a keyboard, a mouse, and the like, the user equipment and/or the browser to perform a corresponding action.

The user interface server 903 and the media server 902 may be deployed together and may also be separately deployed. For an exemplary purpose, only one user interface server 903 and multiple media servers 902 may be deployed on the external IP network. The media server 902 may be deployed near a BRAS (Broadband Remote Access Server, broadband remote access server) or a service router in bypass mode as a separate device, and may also be deployed on the BRAS or service router as an embedded device.

The media server 902 is specifically configured to: receive a media information request sent by the user interface server; acquire media information from a related network or server according to the media information request; and send the media information to the user interface server.

Further, the media server 902 is further configured to: receive a content directory service request sent by the user equipment; acquire the media information from the related network or server according to the content directory service request; and send the media information to the user equipment.

The related network or server includes: a live TV server and a video-on-demand server.

The media server 902 may further be configured to:

save media information acquired from the live TV server according to a preset program, where the preset program may include: a recording time segment and a shelf life.

For an exemplary purpose, if a user hopes to record a current live TV program or a program to be played, the user can control the browser to invoke, by using a control point code, a recording interface of a content directory service unit (Content Directory Service) of the media server to set the recording time segment of the program, that is, the start time and end time for recording are formulated. When the start time for recoding arrives, the media server saves a live TV program stream for the user in the live TV service process until the end time for recording arrives. After the recording ends, program list information is updated, and the media server saves the media information acquired from the live TV server in a corresponding period according to the shelf life in the preset program. The user is capable of accessing a recorded program by using a corresponding user interface of the user equipment. When multiple users need to record a same program, only one program stream actually needs to be stored in the media server, and the multiple users may all have the permission to access the saved program stream. Compared with PVR (Personal video recording, personal video recording) that is performed on a user family terminal, this reduces the usage of memory space.

It should be noted that the media system 90 may further include: a data storage device, where the data storage device is capable of exchanging information with the media server to store media information in the media server. The data storage device may be integrated in a hard disk of the media server, and may also be deployed outside the media server in bypass mode as an external storage device.

The method for acquiring media according to the embodiment of the present invention may apply to multiple media access scenarios, which is capable of implementing a live TV service, a video-on-demand service, and the like.

For an exemplary purpose, after the DLNA user equipment of the home network is started, the user interface server and the media server are discovered by using the device discovery process provided by the embodiment of the present invention, and are displayed on a portal (Portal) page of the user interface server.

Then, according to a remote control input of the user, information about different live TV channels is displayed on a browser interface. The user selects a channel and presses the "Play" button, and a control point code that runs in the browser processes the action.

When the user triggers a live TV (live TV) service media command, the browser that has the control point function controls an MR of the corresponding DLNA user equipment to initiate a media acquiring request to a URL of the selected live TV channel.

The user interface server accesses an EPG (electronic program guide) server to acquire live TV program list information and a user interface element. Then, according to a received media acquiring request sent by the DLNA MR of the DLNA user equipment, the user interface server generates a page element that includes program information and a user interface, where the page element matches an interface of the user equipment that sends the media acquiring request. Particularly, the user interface server may access the EPG (electronic program guide) server and generate and save the page element before the user triggers the live TV service media command, and send the page element corresponding to the user equipment to the DLNA MR after receiving the media acquiring request sent by the DLNA MR of the DLNA user equipment.

The media server accesses the user interface server to acquire live TV program information, and then accesses the live TV server (Live TV Server). If the live TV server sends a live TV media stream in multicast mode, the media server joins a corresponding multicast group. A corresponding protocol request is used in the case of another transmission protocol. This is not limited in the present invention. The live TV media stream is received and properly cached in the media server, and proper format conversion may also be performed on the live TV media stream to adapt to a corresponding DLNA terminal. Particularly, the media server may simultaneously and continuously receive live TV media streams of multiple channels. When the media server receives a content directory service request sent by the DLNA MR of the DLNA user equipment, where the content directory service request includes the URL of a live TV channel specified by a user, a live TV channel media stream of a corresponding channel, which is received and cached by the media server, is sent to the DLNA MR, and the DLNA MR decodes and displays the media stream on the DLNA user equipment. In this way, the user watches a live TV program on the DLNA user equipment. The media server continuously receives and caches live TV streams of a Live TV, and therefore, playing continues until the user switches the channel.

Particularly, in the live TV service process, the media server may save a received live TV program stream for a long time according to the shelf life in the preset program list. After one program is saved, program list information is updated. When using the DLNA terminal to browse program information, the user is capable of watching a new TSTV (Time Shift TV, time shift TV) program. When the user watches the program, the media server sends the saved program stream to the user.

When the user triggers a video-on-demand (VOD) service media command, the browser that has the control point function controls the DLNA MR of the corresponding DLNA user equipment to initiate a media acquiring request to the URL of a selected video-on-demand channel.

The user interface server accesses the EPG server to acquire video-on-demand program list information and the user interface element, and generates program information and a dynamic page of the user interface. The media server accesses the user interface server to acquire video-on-demand program information.

The media server receives the content directory service request of the DLNA MR, where the content directory service request includes a URL of a video-on-demand program specified by the user. The media server requests acquiring the video-on-demand program from a video-on-demand service server according to the video-on-demand program information. After receiving media information returned by the video-on-demand service server, the media server sends the media information to the DLNA MR, and the DLNA MR decodes and displays a media stream. In this way, the user watches the video-on-demand program on the DLNA user equipment until the video-on-demand program ends or the user switches the program. If local storage space of the media server is sufficient, all or part of media streams acquired from the video-on-demand service server may also be saved in the local storage space. When a user watches the video-on-demand program again, the saved media streams do not need to be repeatedly acquired from the video-on-demand service server.

A home network user may also save media content, such as video, pictures, and music, shot by the user in a storage device of the media server by using the DLNA protocol. The media server may further save a UPC (user personalized content) in a storage data center (Storage Data Center). The user accesses an uploading UPC content interface of the media server by using the browser that has the control point function, and the user may specify basic information such as a name of the UPC content. If receiving a request from the user, the media server returns a success response message. Then, the browser controls a digital camera and the like to upload selected media content to the media server. If the local storage space is insufficient, the media server may selectively upload some media to the storage data center. If the user needs to access the video again, the browser may control the user equipment to download it from the storage data center.

It should be noted that the media access scenarios provided by the embodiments of the present invention are only exemplary, and are not intended to limit an application in the prior art. Any variation or replacement readily figured out by persons skilled in the art within the technical scope disclosed in the present invention shall fall within the protection scope of the present invention.

It may be clearly understood by persons skilled in the art that, for the purpose of convenient and brief description, for a detailed working process of the foregoing system, apparatus and unit, reference may be made to the corresponding process in the method embodiment, and the details will not be described herein again.

In the embodiment provided in the present application, it should be understood that the disclosed system, apparatus, and method may be implemented in other modes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiment.

In addition, functional units in the embodiment of the present invention may be integrated into a processing unit, or each of the units may exist alone physically, or two or more units are integrated into a unit. The integrated unit may be implemented through hardware, or may also be implemented in a form of hardware plus a software functional module.

The integrated unit implemented in the form of software functional unit may be stored in a computer readable storage medium. The software functional unit is stored in a storage medium, and contains several instructions used to instruct computer equipment (for example, a personal computer, a server, or network equipment) to perform the steps of the methods according to the embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiment of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for acquiring media, comprising:
   acquiring, by a user interface server located on an IP network, a media acquiring request generated by a browser that is located on a home network and has a control point function, wherein the media acquiring request comprises interface configuration information of a user equipment, wherein the IP network is located outside the home network; and
   generating, by the user interface server, according to the interface configuration information, a page element corresponding to an interface of the user equipment, and sending, by the user interface server, the page element to the user equipment, or
   generating, by the user interface server, according to the interface configuration information, page information corresponding to the interface of the user equipment, and sending, by the user interface server, the page information to the user equipment, wherein the page information comprises the page element and media information;
   wherein the method further comprising:
   generating, by the user interface server, a control point code, and the control point code is executed by the browser to have the control point function.

2. The method according to claim 1, wherein the generating, by the user interface server, according to the interface configuration information, page information corresponding to the interface of the user equipment comprises:
   generating, by the user interface server, according to the interface configuration information, the page element corresponding to the interface of the user equipment;
   sending, by the user interface server, a media information request to a media server according to the media acquiring request;
   receiving, by the user interface server, media information sent by the media server, wherein the media information is acquired by the media server from a related network or server according to the media information request; and
   combining, by the user interface server, the page element and the media information into the page information.

3. A method for acquiring media, comprising:
   generating, by a browser that is located on a home network and has a control point function when a control point code is executed, a media acquiring request according to a media command triggered by a user; and
   controlling, by the browser, a user equipment specified in the media command to enable the user equipment to send the media acquiring request to a user interface server according to uniform resource locator (URL) information of the user interface server, so that the user interface server generates a page element or page information comprising the page element according to the media acquiring request and sends the page element or the page information to the user equipment, wherein the media acquiring request comprises interface configuration information of the user equipment;
   wherein the user interface server is located on an IP network, and the IP network is located outside the home network.

4. The method according to claim 3, before the generating, by a browser, a media acquiring request according to a media command triggered by a user, further comprising:
   acquiring, by the browser, the URL information of the user interface server.

5. The method according to claim 4, wherein the acquiring, by the browser, URL information of the user interface server comprises:
    acquiring, by the browser, the URL information of the user interface server by receiving a Simple Service Discovery Protocol (SSDP) NOTIFY message, wherein the SSDP NOTIFY message comprises the URL information of the user interface server.

6. The method according to claim 5, further comprising:
    acquiring, by the browser, URL information of a media server by receiving the SSDP NOTIFY message, wherein the SSDP NOTIFY message comprises the URL information of the media server.

7. The method according to claim 4, wherein the acquiring, by the browser, URL information of the user interface server comprises:
    acquiring, by the browser, the URL information of the user interface server according to preset redirection entry information, wherein the redirection entry information is the URL information of the user interface server.

8. The method according to claim 7, after the controlling, by the browser, a user equipment specified in the media command to enable the user equipment to send the media acquiring request to a user interface server according to uniform resource locator URL information of the user interface server, further comprising:
    controlling, by the browser, the user equipment to acquire the page information from the user interface server, wherein the page information comprises all the page element and media information, the page element is generated by the user interface server according to the interface configuration information, and the media information is acquired by the user interface server from a media server.

9. The method according to claim 7, after the controlling, by the browser, a user equipment specified in the media command to enable the user equipment to send the media acquiring request to a user interface server according to URL information of the user interface server, further comprising:
    controlling, by the browser, the user equipment to acquire the page element from the user interface server, wherein the page element is generated by the user interface server according to the interface configuration information; and
    controlling, by the browser, the user equipment to send a content directory service request to a media server, so that the media server acquires media information from a related network or server according to the content directory service request and sends it to the user equipment.

10. A user interface server, comprising:
    a first acquiring unit, configured to acquire a media acquiring request generated by a browser, wherein the media acquiring request comprises interface configuration information of a user equipment; and
    a processing unit, configured to generate: according to the interface configuration information, a page element corresponding to an interface of the user equipment, and send the page element to the user equipment, or
    generate, according to the interface configuration information, page information corresponding to the interface of the user equipment, and send the page information to the user equipment, wherein the page information comprises the page element and media information;
    wherein the processing unit is further configured to generate a control point code;
    wherein the user interface server is located on an IP network, the browser is located on a home network and has a control point function when the control point code is executed, and the IP network is located outside the home network.

11. The user interface server according to claim 10, wherein the processing unit is specifically configured to:
    generate, according to the interface configuration information, the page element corresponding to the interface of the user equipment;
    send a media information request to a media server according to the media acquiring request;
    receive media information sent by the media server, wherein the media information is acquired by the media server from a related network or server according to the media information request; and
    combine the page element and the media information into the page information.

12. A browser, comprising:
    a generating unit, configured to generate a media acquiring request according to a media command triggered by a user;
    a control unit, configured to control a user equipment specified in the media command to enable the user equipment to send the media acquiring request to a user interface server according to uniform resource locator (URL) information of the user interface server, so that the user interface server generates a page element or page information comprising the page element according to the media acquiring request and sends the page element or the page information to the user equipment, wherein the media acquiring request comprises interface configuration information of the user equipment;
    a code acquiring unit, configured to acquire a control point code from the user interface server; and
    a running unit, configured to run the control point code to enable the browser to have a control point function;
    wherein the user interface server is located on an IP network, the browser is located on a home network, and the IP network is located outside the home network.

13. The browser according to claim 12, further comprising:
    a second acquiring unit, configured to acquire the URL information of the user interface server.

14. The browser according to claim 13, wherein the second acquiring unit is specifically configured to:
    acquire the URL information of the user interface server by receiving a Simple Service Discovery Protocol (SSDP) NOTIFY message, wherein the SSDP NOTIFY message comprises the URL information of the user interface server.

15. The browser according to claim 14, wherein the second acquiring unit is further configured to:
    acquire URL information of a media server by receiving the SSDP NOTIFY message, wherein the SSDP NOTIFY message comprises the URL information of the media server.

16. The browser according to claim 15, wherein the control unit is further configured to:
    control the user equipment to acquire the page element from the user interface server, wherein the page element is generated by the user interface server according to the interface configuration information; and
    control the user equipment to send a content directory service request to the media server, so that the media server acquires the media information from a related network or server according to the content directory service request and sends it to the user equipment.

17. The browser according to claim 13, wherein the second acquiring unit is specifically configured to:
   acquire the URL information of the user interface server according to preset redirection entry information, wherein the redirection entry information is the URL information of the user interface server.

18. The browser according to claim 17, wherein the control unit is further configured to:
   control the user equipment to acquire page information from the user interface server, wherein the page information comprises the page element and media information, the page element is generated by the user interface server according to the interface configuration information, and the media information is acquired by the user interface server from a media server.

* * * * *